March 11, 1969    M. K. KEELER    3,431,784
AUTOMATIC LIQUID SAMPLER
Filed Aug. 23, 1966
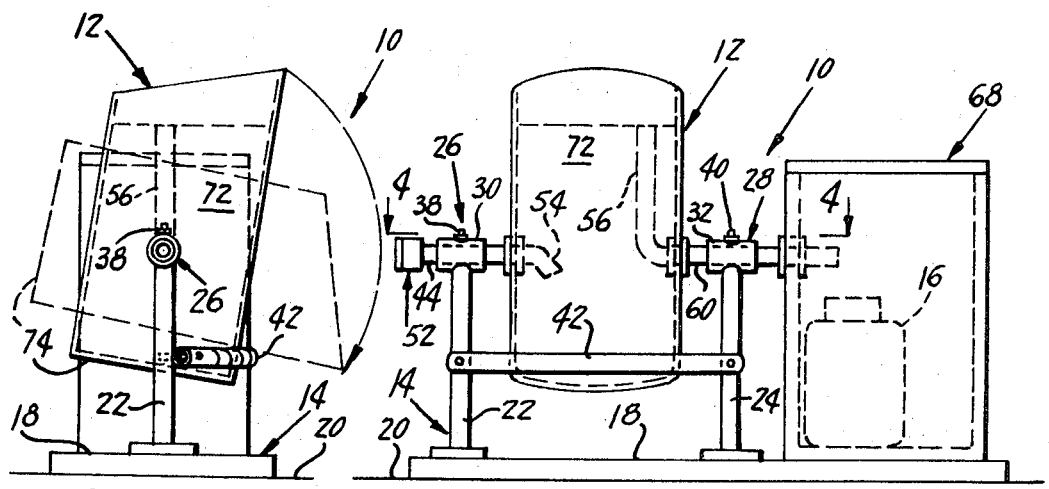
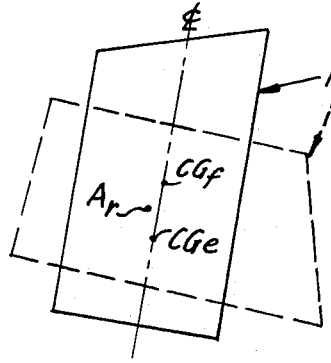
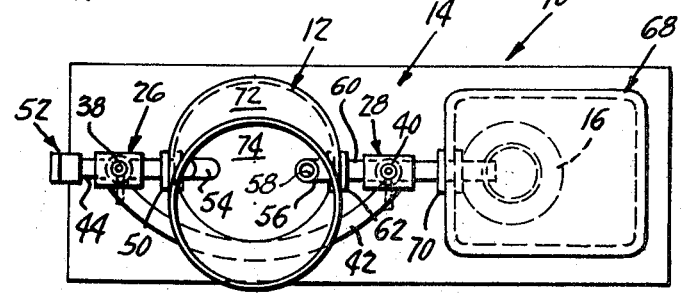
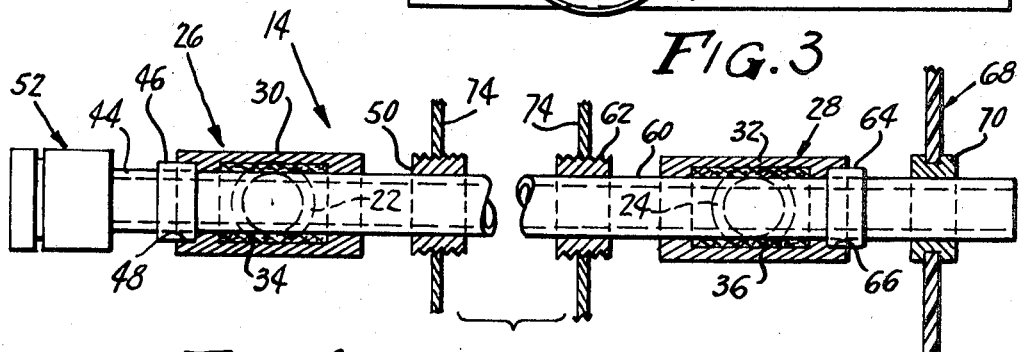
INVENTOR.
MARY K. KEELER
BY *Kimmel, Crowell & Weaver*
ATTORNEYS.

United States Patent Office 3,431,784
Patented Mar. 11, 1969

3,431,784
AUTOMATIC LIQUID SAMPLER
Mary K. Keeler, 2360 Albatross Way,
Sacramento, Calif. 95815
Filed Aug. 23, 1966, Ser. No. 574,384
U.S. Cl. 73—423                                3 Claims
Int. Cl. G01n 1/10

ABSTRACT OF THE DISCLOSURE

A sampler for directing a small quantity of a material into a sample container is disclosed. The sampler includes a tiltable receptacle having a sample standpipe discharge to the sample container with the receptacle being caused to tilt from a filling position to a dumping position and back to a filling position by the shifting of the center of gravity caused by the filling and dumping of the receptacle.

---

This invention relates to a device for automatically taking a sample from a liquid flow stream and is particularly adapted for use in sampling sewage although it may be used for sampling other flowable materials.

It is often necessary to collect samples of sewage waste to determine various operating indicia in order to calculate the type and size of a prospective sewage system or as a means of checking on the efficiency of sewage treatment facilities already installed. It is normally desirable to obtain repeated samples of the sewage stream over an interval of time in order to obtain an average of the operating indicia desired to be measured. Although various types of devices have been proposed by the prior art to obtain such samples, the mechanisms used in the prior art have been unduly complex which often results in sample malfunction or failure thereby resulting in a lack of results or misleading results throught to be accurate.

In brief terms, the device of the instant invention constitutes a simple automatic liquid sampling device comprised of a receptacle mounted for rotational movement about an axis below and to one side of the center of gravity of the receptacle when filled and above and to one side of the center of gravity of the receptacle when empty. The inlet and outlet to the receptacle constitute a pair of conduits extending through the receptacle along the axis of rotation with the actual sampling being accomplished by an apertured standpipe communicating with the outlet conduit. The sampling aperture is spaced from the bottom of the receptacle at about the level at which a raising liquid changes the center of gravity of the receptacle to a point above the axis of rotation. At about the time that liquid is drawn through the apertured standpipe, the receptacle becomes overbalanced and rotates to pour the contents thereof into a standby pit or other reservoir.

It is a primary object of the instant invention to provide a liquid sampling apparatus which is particularly simple in construction and operation and which is completely automatic.

Another object of the instant invention is to provide an automatic sampling device constituting a single liquid receiving receptacle and means for drawing a minute portion of the liquid from the receptacle.

Another object of the instant invention is to provide an automatic liquid sampling device which is compact and light weight to the extent that it may be moved from one sampling location to another with a minimum of inconvenience.

A further object of the instant invention is to provide a sampling device of the character described equipped with a heat insulating chamber for maintaining the sample at a cool temperature.

Other objects and advantages of the instant invention reside in the combinations of elements, arrangements of parts and features of construction and operation, all as will be more fully pointed out hereinafter and disclosed in the accompanying drawing wherein there is shown a preferred embodiment of this invention concept.

In the drawing:

FIGURE 1 is a side elevational view of the sampling apparatus of the instant invention;

FIGURE 2 is an end elevational view of the sampling device of FIGURE 1 illustrating, in solid lines, the liquid receiving receptacle in its normally substantially upright position and illustrating, in dashed lines, the receptacle in the liquid discharging position after the taking of a sample;

FIGURE 3 is a top plan view of the liquid sampling device of FIGURES 1 and 2;

FIGURE 4 is a horizontal cross-sectional view of the liquid sampling device of FIGURES 1 to 3 inclusive, taken substantially along line 4—4 of FIGURE 1 as viewed in the direction illustrated by the arrows, certain parts being omitted for purposes of illustration; and FIGURE 5 is a schematic view of the liquid receiving receptacle showing the centers of gravity thereof when empty and when full and illustrating in dashed lines the tipped condition.

Referring now to the drawing in detail, wherein like reference characters designate like elements throughout the several views thereof, the sample taking apparatus of the instant invention is illustrated generally at 10 having as its major components a liquid receiving receptacle designated generally at 12, mounting means shown generally at 14 supporting receptacle 12 for the pivotal movement shown in FIGURE 2, and a sample receiving container 16 all of which cooperate for taking successive samples from a liquid flow system with which sampler 10 is associated. As will be explained more fully hereinafter, the center of gravity of receptacle 12 is such that receptacle 12 is normally positioned in the solid line position shown in FIGURE 2. When the receptacle is substantially full, as by receiving a quantity of liquid through an inlet conduit, the combined center of gravity of receptacle 12 and the liquid contents therein raises above the axis of rotation of receptacle 12 resulting in the pivoting thereof into the dashed line position shown in FIGURE 2. Shortly before the tipping of receptacle 12 occurs, a sample of the material therein will be drawn off into container 16 for subsequent use. As soon as receptacle 12 becomes overbalanced, the contents therein are expelled and receptacle 12 is automatically returned to the substantially upright position ready for a taking of a subsequent sample.

Mounting means 14 includes a base 18 positioned on an underlying surface 20 carrying a pair of uprights 22, 24 each of which mounts journals shown generally at 26, 28 at the upper end thereof. Journals 26, 28 respectively comprise a housing 30, 32 receiving packing material 34, 36 therein with suitable grease fittings 38, 40 being provided in a conventional manner for maintenance purposes. For purposes more fully explained hereinafter, an arcuate tubular member 42 extends between uprights 22, 24 and acts as a limit to preclude undesirable over-rotation of receptacle 12.

An inlet conduit 44, equipped with an annular boss 46 registering with a suitable recess 48 in housing 30, extends through pivot means 26 and through a seal 50 preferably threaded into the side of receptacle 12 and threaded to conduit 44. A suitable releasable connection 52 is secured to the other end of inlet conduit 44 for connecting sampler 10 to a liquid flow system. It will be seen, therefore, that the liquid to be sampled enters receptacle 12 through inlet conduit 44 which, in a preferred embodiment, may be connected either to a sewage discharge pipe or to a bypass in the sewage discharge conduit. It is preferred that a downwardly angled extension 54 be provided interiorly of receptacle 12 in communication with inlet conduit 44 for directing the influx of material generally toward the bottom of receptacle 12. It has been found that extension 54 creates sufficient turbulence within receptacle 12 as to avoid the settling out of particulate material.

The outlet or sampling side of the instant invention includes an upright substantially vertical standpipe 56 having a liquid receiving aperture 58 at the upper end thereof transmitting the sample to an outlet conduit 60 passing through a seal 62 preferably threaded into the side of receptacle 12. Seal 62 preferably constitutes a collar threadably receiving conduit 60. Conduit 60 also carries an annular boss 64 received in a suitable recess 66 in housing 32 of pivot means 28. The terminal end of outlet conduit 60 extends into a heat insulating chest designated generally at 68, through a rotation accommodating seal 70.

It will be readily apparent that bosses 46, 64 cooperate with housings 30, 32 to center receptacle 12 and preclude lateral movement thereof. It will also be seen that the pivoting of receptacle 12 acts to rotate conduits 44, 60 within journals 26, 28. For this reason, releasable connection 52 should be of the type that accommodates limited rotary movement without effecting the fluid transmitting characteristics thereof. Although mounting means 14 has been illustrated as including inlet and outlet conduits fixed with receptacle 12 for movement therewith, it should be understood that stationary conduits equipped with rotation accommodating seals at the junction of the conduits and receptacle 12 may be used.

Receptacle 12 is illustrated as including a closed circumferential wall 72, a bottom wall 74 perpendicular to the axis of wall 72 and an open top described by a plane at an acute angle with respect to bottom wall 74. The construction of the open top of receptacle 12 provides a pouring spout to discharge the expelled liquids into a collecting reservoir conventionally called a "back flush" in the sewage treatment art. It should be understood, however, that receptacle 12 may be in any configuration sufficient to fulfill the center of gravity requirements as explained more fully hereinafter. It is also evident that receptacle 12 may be made of any convenient material, such as metal or plastic.

It should be noted that the axis of journals 26, 28, designated schematically in FIGURE 5 as $A_r$ resides to one side of the center line of receptacle 12. This feature results in a slight tilt to receptacle 12 when it is empty. It will be noted that the axis of rotation resides between the center of gravity of the empty receptacle and the combined center of gravity of the receptacle and the liquid placed therein. During the filling of receptacle 12 through inlet conduit 44, the center of gravity of the receptacle and the liquid changes along a path between $CG_e$ and $CG_f$. As soon as the moment created by the imbalance of receptacle 12 is sufficient to tip the receptacle, the liquid discharged therein pours through the open top of the receptacle into the back flush as previously mentioned.

Liquid receiving orifice 58 of standpipe 56 is positioned at a point within receptacle 12 such that a portion of the liquid contained therein will pass through aperture 58, standpipe 56 and outlet conduit 60 into sampler container 16 just before the tipping of receptacle 12 occurs. Although the height of aperture 58 may be regulated slightly, it is preferred that aperture 58 be placed at the exact point of tipping. This will act to minimize sample quantity and yet insure the taking of a sample at each tipping of receptacle 12.

As previously mentioned, arcuate member 42 is positioned between uprights 22, 24 to act as a limit means or stop to prevent over-rotation of receptacle 12. It will be readily apparent that without the use of member 42, inertia caused by the movement of receptacle 12 will tend to rotate the upper end of receptacle 12 over base 18 thereby discharging a quantity of the sample liquid thereon. For reasons of maintenance and cleanliness, this is an undesirable feature. Member 42 similarly acts as a limit means when receptacle 12 is moving back to the substantially upright position shown in solid lines in FIGURE 2 and precludes the oscillation of receptacle 12 that would ordinarily take place.

It is now seen that there is herein provided an improved sampler which accomplishes all of the objects and advantages of the instant invention and others, including many advantages of great practical utility and commercial importance.

Since many embodiments may be made of the instant inventive concept, and since many modifications may be made in the embodiment hereinbefore shown and described, it is to be understood that the foregoing is to be interpreted merely as illustrative and not in a limiting sense.

I claim:
1. An automatic liquid sampling device comprising
an upright receptacle,
a base,
a pair of uprights on said base and extending upwardly therefrom in spaced parallel relation,
a journal mounted on the upper end of each of said uprights with said journals arranged in axial alinement with each other,
an inlet conduit journaled in one of said journals and extending into said receptacle,
means fixedly mounting said receptacle on said inlet conduit,
an extension angled downwardly and inwardly on the inner end of said inlet conduit terminating within said receptacle,
an outlet conduit journaled in the other of said journals and extending into said receptacle,
means fixedly mounting said receptacle on said outlet conduit, said receptacle being mounted on said journals so that the center of gravity of the empty receptacle is below the axis of said journals and the center of gravity of the filled receptacle just prior to dumping is above and to one side the axis of said journals,
an apertured standpipe adjustably secured to the inner of said outlet conduit within said receptacle and extending perpendicularly to said outlet conduit, said standpipe being adapted for drawing off a sample with the sampling aperture being spaced from the bottom of the receptacle at about the level at which a rising liquid moves the center of gravity of the filling receptacle above the axis of the journals,
means connecting said uprights for limiting the tilting movement of said receptacle when dumping and the swinging movement of said receptacle when returning to its filling position, and
a container underlying the outer end of said outlet conduit to receive the sample discharged therefrom.

2. The invention as set forth in claim 1 wherein the adjustable connection of said standpipe to said outlet conduit includes an elbow threaded onto the inner end of said outlet conduit with said standpipe threaded into the open end of said elbow.

3. The invention as set forth in claim 1 wherein the means mounting said receptacle on said inlet conduit and the means mounting said receptacle on said outlet conduit each provides a water-tight seal.

References Cited

UNITED STATES PATENTS

| | | | |
|---|---|---|---|
| 693,690 | 2/1902 | Dodd | 73—423 |
| 1,016,361 | 2/1912 | Redfield et al. | 73—217 X |
| 1,593,623 | 7/1926 | Elliott et al. | 73—422 X |
| 2,348,806 | 5/1944 | Gillard et al. | 73—422 |
| 3,005,343 | 10/1961 | Brown et al. | 73—217 |
| 3,225,947 | 12/1965 | Anderson | 222—166 X |

LOUIS R. PRINCE, *Primary Examiner.*

D. M. YASICH, *Assistant Examiner.*